Figure 1:
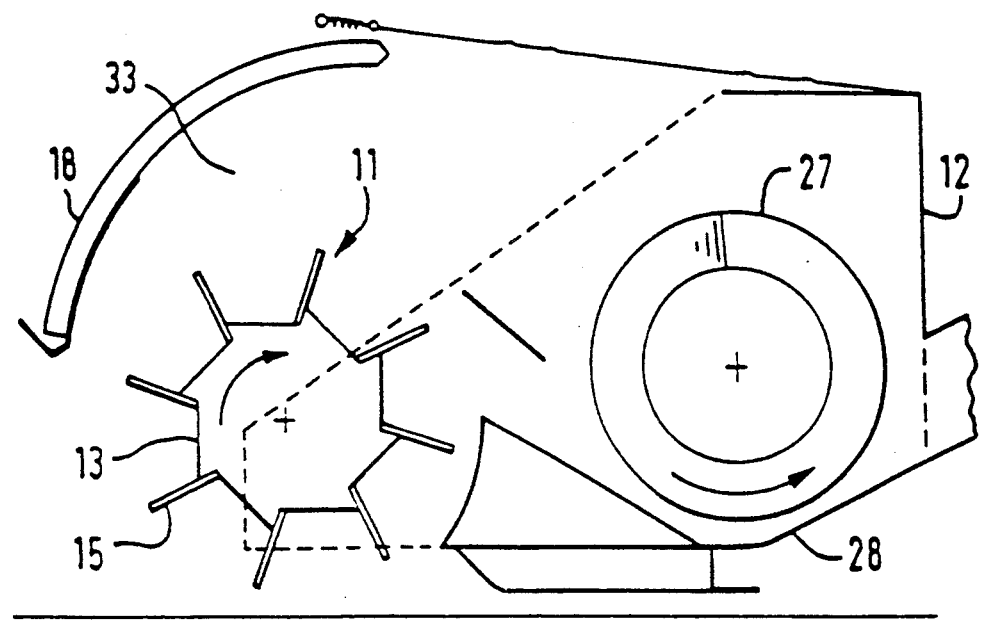

United States Patent [19]

Hale et al.

[11] Patent Number: 5,175,984
[45] Date of Patent: Jan. 5, 1993

[54] CROP HARVESTING APPARATUS

[75] Inventors: Oliver D. Hale, Haynes; Robert N. Hobson, Cople; Vien N. Nguyen, Hockley, all of England

[73] Assignee: British Technology Group Limited, London, England

[21] Appl. No.: 671,790

[22] PCT Filed: Aug. 6, 1990

[86] PCT No.: PCT/GB90/01225

§ 371 Date: Mar. 26, 1991

§ 102(e) Date: Mar. 26, 1991

[87] PCT Pub. No.: WO91/01626

PCT Pub. Date: Feb. 21, 1991

[30] Foreign Application Priority Data

Aug. 7, 1989 [GB] United Kingdom ............ 8918015.2

[51] Int. Cl.⁵ .................... A01D 45/30; A01D 65/02
[52] U.S. Cl. ........................................ 56/130; 56/364
[58] Field of Search ............... 56/130, 126, 127, 128, 56/364, DIG. 2, DIG. 19, 129

[56] References Cited

U.S. PATENT DOCUMENTS 4,578,937  4/1986  West et al. ............... 56/364 X
4,790,128  12/1988  Klinner ....................... 56/364
4,843,806  7/1989  Klinner ....................... 56/364
5,036,653  8/1991  Klinner ....................... 56/130

FOREIGN PATENT DOCUMENTS 60116  12/1967  Australia .
2188822  10/1987  United Kingdom .

Primary Examiner—Terry Lee Melius
Attorney, Agent, or Firm—Cushman, Darby & Cushman

[57] ABSTRACT

Apparatus for harvesting required crop parts from standing crop, leaving stripped stems in the field, comprises a crop stripping rotor under a hood. A plurality of outwardly projecting crop stripping elements are mounted on the rotor and move upwardly and rearwardly as the apparatus moves forwardly into the crop. The distal tips of the elements enter the crop and move upwardly through the crop, gathering one or more crop stems. Between adjacent crop stripping elements two succeeding relief regions are provided. Gathered crop enters the first relief region and required parts are stripped by edges of the relief region. Stripped stems pass to the second relief region for easy release and in order to avoid rejecting unstripped stems from the first relief region.

8 Claims, 3 Drawing Sheets

CROP HARVESTING APPARATUS

The present invention relates to apparatus for harvesting crop.

The invention is concerned with detaching from the stems or other plant parts of standing crop, seeds, seed-bearing parts, leaves, twigs, flowers, or other predetermined required portion of the crop, collecting the required portion, and leaving the remaining stripped parts of the crop standing in the field. The invention has particular but not exclusive application in the harvesting of grain crops, such as wheat, oats, barley, and rice. The invention also has application in the stripping of leaves, young shoots, and sometimes blossom from crops. Examples include lucerne (alfalfa) leaves for protein production, and the leaves and flowers of herbs and other crops used for the extraction of essential oils and other constituents.

There have been proposed over very many years a large number of different forms of apparatus for detaching grain, or other required portions of a crop, from a standing crop, to leave the remaining stripped parts of the crop standing in the field. None of the earlier of these previous machines has found commercial acceptance, and such machines have various disadvantages.

However, there have been described in our published patent applications WO 86/01972 and GB-A-2188822, a number of forms of new crop stripping machines which have proved successful in the field and have been put into commercial practice.

It is an object of the present invention to provide improved apparatus for and methods of stripping required parts from a standing crop, generally of the kind set out in our published applications numbered above.

By the term standing crop is meant crop in the field before any harvesting operation has been carried out on it, for example before any cutting operation, and the term standing crop includes crop which may be laid, leaning, or twisted, as well as upright crop.

According to the present invention in one aspect there is provided apparatus for harvesting required crop parts from standing crop comprising a mobile frame for movement over the ground, moveable support means mounted for driven movement relative to the frame, a plurality of outwardly projecting crop engaging elements mounted on the moveable support means in rows transverse to the normal direction of forward travel of the apparatus, guide means cooperating with the crop engaging elements to form a crop flow passage, and drive means for driving the moveable support means to carry the elements upwardly at a front region of the apparatus so as to detach from standing crop predetermined required parts of the crop and to move the detached crop parts along the crop flow passage, the crop engaging elements being arranged to engage standing crop while projecting forwardly relative to the direction of forward travel of the apparatus, the crop engaging elements being arranged to form a plurality of crop gathering regions each having an intake region with inwardly converging boundaries leading to at least two succeeding relief regions which lead inwardly away from the distal ends of the elements, each relief region having boundaries which diverge from each other at the entrance to the relief region, and the width of the entrance to each relief region being less than the depth of that relief region in the inward direction away from the distal ends of the elements, each crop gathering region being defined by adjacent crop engaging elements in the same transverse row, in which the entrance to the second relief region is formed between opposed prominent salients on the sides of adjacent elements produced by respective junctions of the boundaries of the first relief region with the boundaries of the second relief region. The tip of each salient may be rounded, or may be pointed.

Preferably the entrance to the second relief region is formed between opposed cusps on the sides of adjacent elements produced by respective junctions of curved boundaries of the first relief region with curved boundaries of the second relief region. Preferably each cusp is formed at the intersection of two circles, with the tangents to the circles at the point of intersection being inclined to each other at an angle of 90° or, more preferably, less than 90°.

Preferably the entrance to the first relief region is formed between respective junctions of the inwardly converging boundaries of the intake region with the diverging boundaries of the first relief region.

In accordance with one preferred feature the boundaries of the first relief region include edges of crop engaging elements facing away from the distal ends of the elements adapted to detach crop parts from regions of the standing crop which face forwardly relative to the intended direction of movement of the apparatus and preferably the second relief region is adapted to allow remaining stripped crop parts to be released from the elements.

Other features are that the boundary of each relief region is preferably a curved boundary, and most preferably lies substantially on a circle. Conveniently each crop engaging element has a distal tip for entering into and dividing crop, and has side edges diverging from each other in a direction away from the distal tip of the element.

Preferably each crop engaging element has a transverse surface for impelling detached crop parts along the crop flow passage, and the drive means is arranged to drive the crop engaging elements at a speed such that detached crop parts are impelled along the crop flow passage and do not reside to any substantial extent on the moving elements.

Also preferably the crop stripping elements are resiliently mounted, and/or made of flexible resilient material. Preferably the said crop stripping elements are arranged with elements which follow each other around the support means being in register with one another. The moveable support means may comprise a rotor or an endless conveyor. Preferably the guide means comprises a cover extending at least around part of the region at which the crop engaging elements move upwardly at the front region of the apparatus.

Features of the invention which have been set out in connection with apparatus according to the invention may also be provided in accordance with a method of the invention. In particular, there may be provided a method of harvesting crop comprising moving through a standing crop a harvesting apparatus, moving upwardly at a front region of the apparatus a plurality of outwardly projecting crop engaging elements arranged in rows transverse to the normal direction of forward travel of the apparatus, engaging the standing crop by the moving elements when projecting forwardly relative to the direction of movement of the apparatus, gathering crop in crop gathering regions of the elements having boundaries converging inwardly away from the distal ends of the elements, guiding the crop to at least two succeeding relief regions which are provided at the junction of adjacent crop engaging elements in the same transverse row and which lead inwardly away from the distal ends of the elements, each relief region having boundaries which diverge from each other at the entrance to the relief region, and the width of the entrance to each relief region being less than the depth of that relief region in the inward direction away from the distal ends of the elements, detaching crop parts by the effect of edges of the elements defining the first relief region, retaining stripped crop stems in the second relief region, prior to disengagement due to forward movement of the apparatus, by means of opposed prominent salients on edges of the adjacent elements at the entrance to the second relief region, and releasing remaining stripped crop stems from the elements through the second relief region.

There will now be described a number of further, independent aspects of the present invention which will be set out with reference to apparatus for harvesting required crop parts from standing crop (hereinafter referred to as apparatus as specified) comprising a mobile frame for movement over the ground, moveable support means mounted for driven movement relative to the frame, a plurality of outwardly projecting crop engaging elements mounted on the moveable support means in rows transverse to the normal direction of forward travel of the apparatus, guide means cooperating with the crop engaging elements to form a crop flow passage, and drive means for driving the moveable support means to carry the elements upwardly at a front region of the apparatus so as to detach from standing crop predetermined required parts of the crop and to move the detached crop parts along the crop flow passage, the crop engaging elements being arranged to engage standing crop while projecting forwardly relative to the direction of forward travel of the apparatus, the crop engaging elements being arranged to form a plurality of crop gathering regions each having an intake region with inwardly converging boundaries leading to at least two succeeding relief regions which lead inwardly away from the distal ends of the elements, each relief region having boundaries which diverge from each other at the entrance to the relief region, and the entrance to each relief region being small compared with the depth of that relief region in the inward direction away from the distal ends of the elements, each crop gathering region being defined by adjacent crop engaging elements in the same transverse row.

In accordance with one further aspect of the invention there is provided apparatus as specified in which the entrance to the second relief region is formed between opposed respective junctions of the boundaries of the first relief region with the boundaries of the second relief region, and in which the angle of approach of the boundaries in the region of each junction, if constant, is less than 100°, preferably about 90° or less, and, if not constant, is when at its smallest value, less than 100°, preferably about 90° or less.

In accordance with the invention in another further aspect there may be provided apparatus as specified in which the entrance to the second relief region is formed between opposed salients on the sides of adjacent elements, and in which the angle of approach of the sides of the salient, if constant, is less than 100°, preferably about 90° or less, and, if not constant, is, when at its smallest value, less than 100°, preferably about 90° or less.

Thus in some arrangements the sides of the salient may be straight with the angle of approach constant, and in other arrangements the or one of the sides may be curved, with the angle of approach of the sides of the salient (taken as a tangent to the curve) varying.

In accordance with the invention in another further aspect there is provided apparatus as specified in which the entrance to the second relief region is formed between opposed cusps on the sides of adjacent elements produced by respective junctions of curved boundaries of the first relief region with curved boundaries of the second relief region.

In accordance with the invention in another further aspect there is provided apparatus as specified in which the entrance to the second relief region is formed between opposed acute apexes on the sides of adjacent elements produced by respective junctions of the boundaries of the first relief region with the boundaries of the second relief region.

In accordance with the invention in another further aspect there is provided apparatus as specified in which the entrance to the first relief region is formed between respective junctions of the inwardly converging boundaries of the intake region with the diverging boundaries of the first relief region.

Figures 3A, 3B:
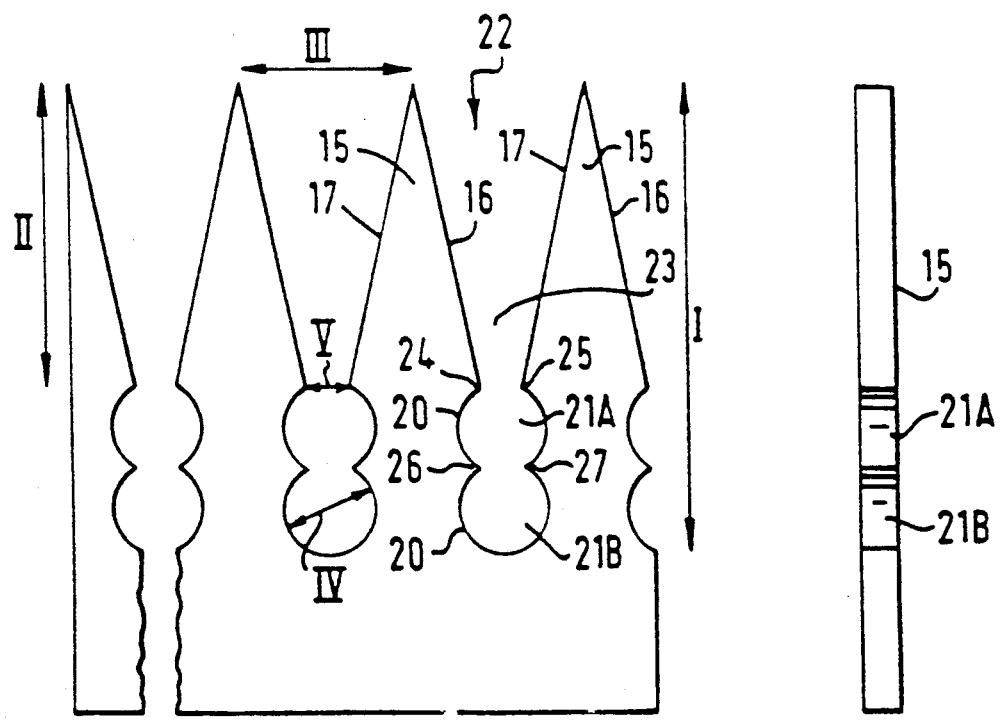
Figure 2A:
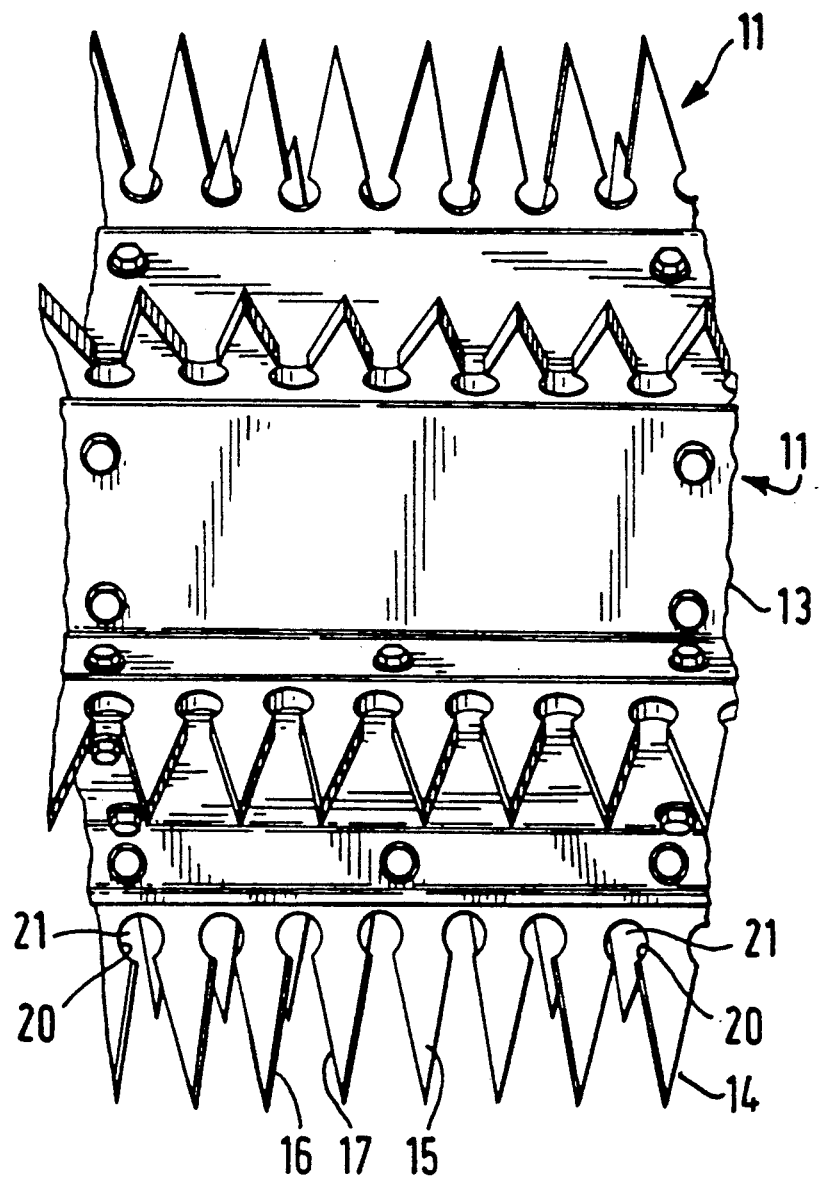
Figure 2B:
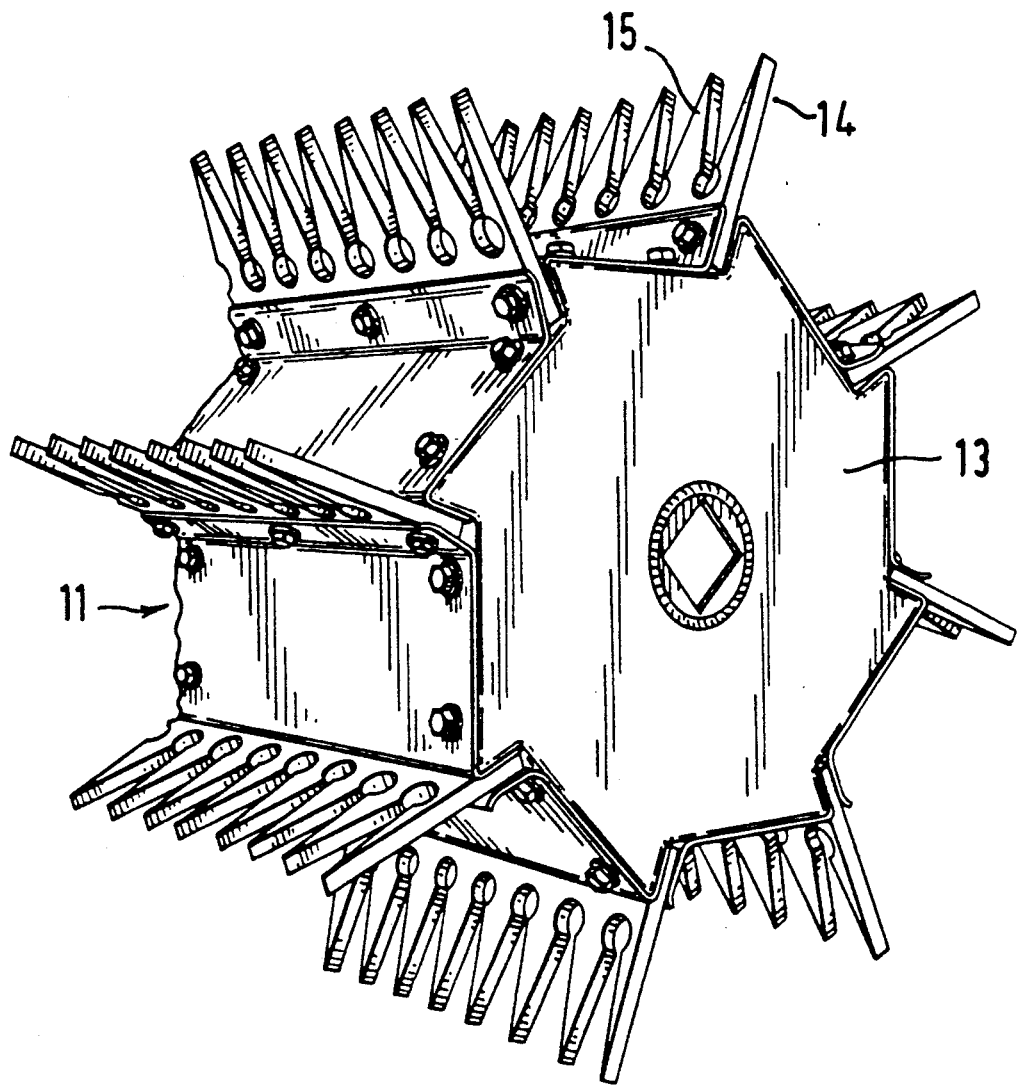

Embodiments of the invention will now be described by way of example with reference to the accompanying drawings in which:

FIG. 1 is a diagrammatic cross section of a grain stripping apparatus which may embody the invention;

FIGS. 2(a) and 2(b) show front and side views of a known crop stripping rotor suitable for use in the apparatus of FIG. 1;

FIGS. 3a and 3b show respectively a diagrammatic cross section, and a diagrammatic plan view, of a crop engaging element for use in the apparatus of FIG. 1 when embodying the invention.

Referring to FIGS. 1 and 2, the apparatus shown by way of example is a harvesting apparatus for stripping grain from a cereal crop. The apparatus comprises a mobile frame 12 on which is mounted a rotor 11, carrying outwardly projecting crop engaging elements 15. The rotor 11 is driven in the so-called overshot mode so that the crop engaging elements 15 are moved in an upward direction at the front of the apparatus. A hood or cover 18 extends around at least part of the front half of the rotor and defines with the rotor elements 15 a crop flow passage 33 along which crop is conveyed by the rotor.

In operation, rotation of the rotor 11 moves the crop engaging elements 15 so that the distal tips of the elements enter the crop with minimum disturbance of the stems of the crop, the elements 15 then move upwardly through the crop, gathering one or more crop stems. As the elements 15 reach the upper parts of the crop the required crop parts, for example grain, are detached from the stems. After detachment, the required crop parts are conveyed upwardly and rearwardly over the rotor 11 and pass to a transverse crop feed auger 27 positioned within a collecting trough 28, for transferring crop laterally towards the centre of the apparatus. The crop is then transferred rearwardly by a slatted chain elevator (not shown) up an inclined pathway.

The rotor 11 comprises an inner core 13 and a succession of transverse combs 14 spaced circumferentially around the rotor. Each tooth 15 of the comb has side edges 16 and 17 which diverge from each other in a direction away from the distal tip of the tooth 15. There is provided at the junction of each adjacent pair of side edges 16 and 17 of adjacent teeth 15, an enlarged aperture 21 formed by relieved portions of adjacent teeth at the base regions thereof. In operation material including free grain, grain heads, and some straw, is dislodged by the edges of the apertures 21 of the teeth 15, and is impelled upwardly and rearwardly along the passage 33 to the auger 27.

The general operation of the crop stripping rotor 11 may be as set out in our prior published patent applications WO 86/01972, and GB-A-2188822.

Observation of high speed film of stripping apparatus shows that the first lengths of crop to be stripped by the rotor are generally standing vertically when they are first contacted by the rotor. This means that the stems enter the crop gathering V at a tangent to the rotor. It is believed that these first stems then pass right down into the keyhole (in a conventional single keyhole as shown in FIG. 2a) before being stripped, with the advantageous result that the crop is predominantly stripped by the hole of the keyhole, and not by the converging crop gathering sides 16 and 17. When this happens, the stripped crop is given a better trajectory, and losses are reduced.

As the rotor proceeds into the crop, the stripped stems of the crop become more and more forwardly bent, and it appears that crop which has already been stripped, remains in the hole 21 of the keyhole, and prevents fresh crop from entering into the keyhole. This means that the newer crop which is to be stripped, is having more grain stripped by the side edges 16 and 17 of the crop gathering region, rather than by the circular edges of the actual hole 21 of the keyhole. This stripping by the inclined side edges of the elements, gives the detached crop a less favourable trajectory, with consequent losses.

FIGS. 3a and 3b show an improved form of the crop stripping elements 15 of FIG. 2. Adjacent crop stripping elements 15 define a crop gathering region 22 which has an intake region 23 with inwardly converging boundaries formed by the side edges 16 and 17 of adjacent crop engaging elements 15. The crop gathering region 22 also has two succeeding relief regions 21A and 21B which succeed each other inwardly away from the distal ends of the elements 15.

Each relief region is bounded by edges 20 of adjacent crop engaging elements. The entrance to the first relief region 21A is formed between respective junctions 24 and 25 of the inwardly converging boundaries 16 and 17 of the intake region 23, with the diverging boundaries 20 of the first relief region 21A. The entrance to the second relief region is formed by opposed cusps 26 and 27 produced by respective junctions 26 and 27 of the curved boundaries 20 of the first relief region 21A with the curved boundaries 20 of the second relief region 21B. The width of the entrance to each relief region 21A and 21B is less than the width of the relief region, and is less than the depth of the relief region in the inward direction away from the distal ends of the elements 15. Conveniently the width of the entrance to a relief region is about half the width and is also about half the depth, of the relief region itself. The cusps 26 and 27 constitute opposed salients on the sides of adjacent elements 15, and the entrance to the second relief region 21B is formed between the opposed salients. It will be appreciated that in use, or in original manufacture, the opposed cusps 26 and 27 may be slightly rounded from the pointed shapes shown in the figure.

The double keyhole shape shown in FIG. 3b has been found to give improved stripping of crop, and reduced losses. It is believed that the following factors play a part in this improvement. It is believed that, with the double keyhole shown in FIG. 3b, that stripping takes place in the first hole 21A of the keyhole, and the second hole 21B of the keyhole is available as a reservoir for already stripped crop stems. Thus when the rotor is well forward into the crop, crop stems which are already stripped can be held in the innermost hole 21B (the "reservoir") until release takes place as the machine moves forward. Fresh crop can pass from the inclined side edges 16 and 17 into the first hole 21A, and can be stripped in the most favourable manner by the edges of the first hole 21A.

It is believed that there is particular advantage in the configuration shown in FIG. 3b. It is believed that the opposed peaks 24 and 25 at the entrance to the first relief region 21A allow the rapid movement of crop from the intake region 23 into the first relief region 21A, with minimum back pressure on unstripped stems. The immediate conjunction of the inwardly converging edges 16 and 17, with the diverging edges 20 of the relief region 21A, allows crop to pass easily into the first relief region 21A to be stripped.

Similarly, the opposed cusps 26 and 27 at the entrance to the second relief region 21B allow the easy passage of stripped stems away from the stripping aperture 21A into the reservoir aperture 21B as the machine moves forward, but at the same time provide sufficient pinch point between the two holes 21A and 21B to hold the stripped straw out of the way of the unstripped straw.

Referring to FIG. 3b, the main dimensions which determine the form of the crop engaging elements are: the overall length of each crop engaging element 15, indicated at I; the length of the outer portion of each crop engaging element 15, beyond the entrance to the first relief aperture, indicated at II; the pitch of the tips of the crop engaging elements 15, that is to say the transverse distance between the tips, indicated at III; the diameter of the relief apertures 21A and 21B, indicated at IV; and the transverse width of the entrance to each relief aperture 21A and 21B, indicated at V.

Preferred ranges for these dimensions are as follows.

| | |
|---|---|
| Overall length I of crop engaging element 15. | 80 mm to 120 mm preferably 100 mm |
| Length II of outer part of crop engaging element 15, from entrance to relief aperture to tip. | 45 mm to 75 mm, preferably 60 mm |
| Pitch III of tips of crop engaging elements 15. | 30 mm to 60 mm, preferably 40 mm |
| Diameter IV of relief region. | 15 mm to 30 mm, preferably 20 mm |
| Transverse width V of entrance to relief region. | 8 mm to 12 mm, preferably 10 mm |

One guide which may be used in selecting these dimensions is that preferably the diameter IV of each relief region lies in the range of one quarter to one half, of the length II of the outer portion of the crop engaging element taken from the entrance to the first aperture, to the tip of the element, preferably the ratio being one third.

Preferably the transverse width V of the entrance to a relief aperture is in the range one third to two thirds of the diameter IV of the relief aperture, most preferably about half the diameter of the aperture. In the case shown, the width of the entrance is set at half the width of the relief aperture, but is slightly greater than half the depth of the relief aperture.

Preferably the diameter IV of a relief region lies in the range one third to two thirds of the pitch III of the tips of the elements, most preferably being equal to one half the pitch of the tips of the elements.

As has been set out hereinbefore it is a feature of the invention that the entrance to the second relief region is formed between opposed salients on the sides of adjacent crop stripping elements. Numerous variations may be made in the shape of the salients, and various criteria may be adopted in setting the shape. Where the sides of a salient are straight, the angle of approach of the sides may exceed 90°, for example 100°, although it is preferred that the angle of approach is about 90° or less, for example in the range 90° to 60°. Where the sides of the salient are curved, the angle of approach of the sides will vary, and preferably is, when at its smallest value, about 90° or less than 90°.

There is shown in our prior published application GB-A-2188822, an example of a crop stripping rotor with crop engaging elements which define between inwardly converging side edges of elements, two succeeding relief regions. However these regions do not possess the particular features set out hereinbefore in accordance with the invention.

We claim:

1. Apparatus for harvesting required crop parts from standing crop comprising:
   a mobile frame for movement over the ground,
   moveable support means mounted for driven movement relative to the frame,
   a plurality of outwardly projecting crop engaging elements mounted on the moveable support means in rows transverse to the normal direction of forward travel of the apparatus,
   guide means cooperating with the crop engaging elements to form a crop flow passage, and
   drive means for driving the moveable support means to carry the elements upwardly at a front region of the apparatus so as to detach from standing crop predetermined required parts of the crop and to move the detached crop parts along the crop flow passage, the crop engaging elements being arranged to engage standing crop while projecting forwardly relative to the direction of forward travel of the apparatus,
   the crop engaging elements being arranged to form a plurality of crop gathering regions each having an intake region with inwardly converging boundaries leading to at least two succeeding relief regions which lead inwardly away from the distal ends of the elements, each relief region having boundaries which diverge from each other at the entrance to the relief region, and the width of the entrance to each relief region being less than the depth of that relief region in the inward direction away from the distal ends of the elements, each crop gathering region being defined by adjacent crop engaging elements in the same transverse row,
   in which said boundaries of each said relief region are curved concave boundaries, said entrance to said first relief region being formed between respective junctions of said inwardly converging boundaries of said intake region with said diverging boundaries of said first relief region, and said entrance to said second relief region being formed between opposed cusps on the sides of adjacent elements produced by respective junctions of said curved concave boundaries of said first relief region with said curved concave boundaries of said second relief region.

2. Apparatus according to claim 1 in which the boundaries of the first relief region include edges of crop engaging elements facing away from the distal ends of the elements adapted to detach crop parts from regions of the standing crop which face forwardly relative to the intended direction of movement of the apparatus, and the second relief region is adapted to allow remaining stripped crop parts to be released from the elements.

3. Apparatus according to claim 1 in which the boundary of each relief region is a curved boundary.

4. Apparatus according to claim 1 in which the boundary of each relief region lies substantially on a circle.

5. Apparatus according to claim 1 in which each crop engaging element has a distal tip for entering into and dividing crop, and has side edges diverging from each other in a direction away from the distal tip of the element, each crop engaging element having a transverse surface for impelling detached crop parts along the crop flow passage.

6. Apparatus according to claim 1 in which the said crop stripping elements are arranged with elements which follow each other around the support means being in register with one another.

7. Apparatus according to claim 1 in which the moveable support means comprises a rotor, and the guide means comprises a cover extending at least around part of the region at which the crop engaging elements move upwardly at the front region of the apparatus.

8. A method of harvesting crop comprising:
   moving through a standing crop a harvesting apparatus,
   moving upwardly at a front region of the apparatus a plurality of outwardly projecting crop engaging elements arranged in rows transverse to the normal direction of forward travel of the apparatus,
   engaging the standing crop with the moving elements when projecting forwardly relative to the direction of movement of the apparatus,
   gathering crop in crop gathering regions of the elements having boundaries converging inwardly away from the distal ends of the elements,
   guiding the crop to at least two succeeding relief regions which are provided at the junction of adjacent crop engaging elements in the same transverse row and which lead inwardly away from the distal ends of the elements, each relief region having boundaries which diverge from each other at the entrance to the relief regions and the width of the entrance to each relief region being less than the depth of that relief region in the inward direction away from the distal ends of the elements, said boundaries of each said relief region being curved concave boundaries,
   detaching crop parts by the effect of edges of the elements defining the first relief region, said entrance to said first relief region being formed between respective junctions of said inwardly converging boundaries of said intake region with said diverging boundaries of said first relief region.

retaining stripped crop stems in the second relief region, prior to disengagement due to forward movement of the apparatus, by means of opposed cusps on the sides of adjacent elements produced by respective junctions of said curved concave boundaries of said first relief region with said curved concave boundaries of said second relief regions at the entrance to the second relief region, and releasing remaining stripped crop stems from the elements through the second relief region.

* * * * *